United States Patent
Haran

(10) Patent No.: US 10,355,549 B1
(45) Date of Patent: Jul. 16, 2019

(54) ACTIVELY SHIELDED SUPERCONDUCTING MACHINES

(71) Applicant: Kiruba Sivasubramaniam Haran, Champaign, IL (US)

(72) Inventor: Kiruba Sivasubramaniam Haran, Champaign, IL (US)

(*) Notice: Subject to any disclaimer, the term of this patent is extended or adjusted under 35 U.S.C. 154(b) by 334 days.

(21) Appl. No.: 15/344,380

(22) Filed: Nov. 4, 2016

Related U.S. Application Data

(60) Provisional application No. 62/250,847, filed on Nov. 4, 2015.

(51) Int. Cl.
 *H02K 3/28* (2006.01)
 *H02K 1/12* (2006.01)
 *H02K 1/22* (2006.01)

(52) U.S. Cl.
 CPC .............. *H02K 3/28* (2013.01); *H02K 1/12* (2013.01); *H02K 1/22* (2013.01); *H02K 2203/12* (2013.01); *H02K 2209/00* (2013.01)

(58) Field of Classification Search
 CPC .. H02K 3/28; H02K 1/12; H02K 1/22; H02K 2209/00; H02K 2203/12
 USPC ................................................. 310/179–210
 See application file for complete search history.

(56) References Cited

U.S. PATENT DOCUMENTS

| | | | | |
|---|---|---|---|---|
| 5,350,958 A | * | 9/1994 | Ohnishi | H02K 53/00 310/10 |
| 7,821,164 B2 | | 10/2010 | Laskaris et al. | |
| 2004/0145265 A1 | * | 7/2004 | Heiberger | F16C 39/06 310/178 |
| 2008/0197633 A1 | * | 8/2008 | Laskaris | H02K 55/02 290/44 |
| 2012/0049531 A1 | * | 3/2012 | Bray | H02K 7/1838 290/55 |
| 2012/0161568 A1 | * | 6/2012 | Umemoto | H02K 3/47 310/198 |

OTHER PUBLICATIONS

Gautam Sinha, Ravishankar Sundararaman, Gurnam Singh, Design Concepts of Optimized MRI Magnet, IEEE Transactions on Magnetics, Oct. 2008, pp. 2351-2360, vol. 44, No. 10, IEEE, USA.

* cited by examiner

*Primary Examiner* — Naishadh N Desai
(74) *Attorney, Agent, or Firm* — Singleton Law Firm, P.C.

(57) ABSTRACT

A machine for obtaining very high power density is provided, significantly increasing the air-gap magnetic flux density and eliminating the ferromagnetic steel traditionally employed to carry and shield magnetic flux. In one embodiment, an arrangement of main coils and a set of compensating coils is employed to cancel out the field outside the machine without the use of iron while maintaining air gap field levels that are 3 to 10 times greater than conventional machines.

16 Claims, 8 Drawing Sheets

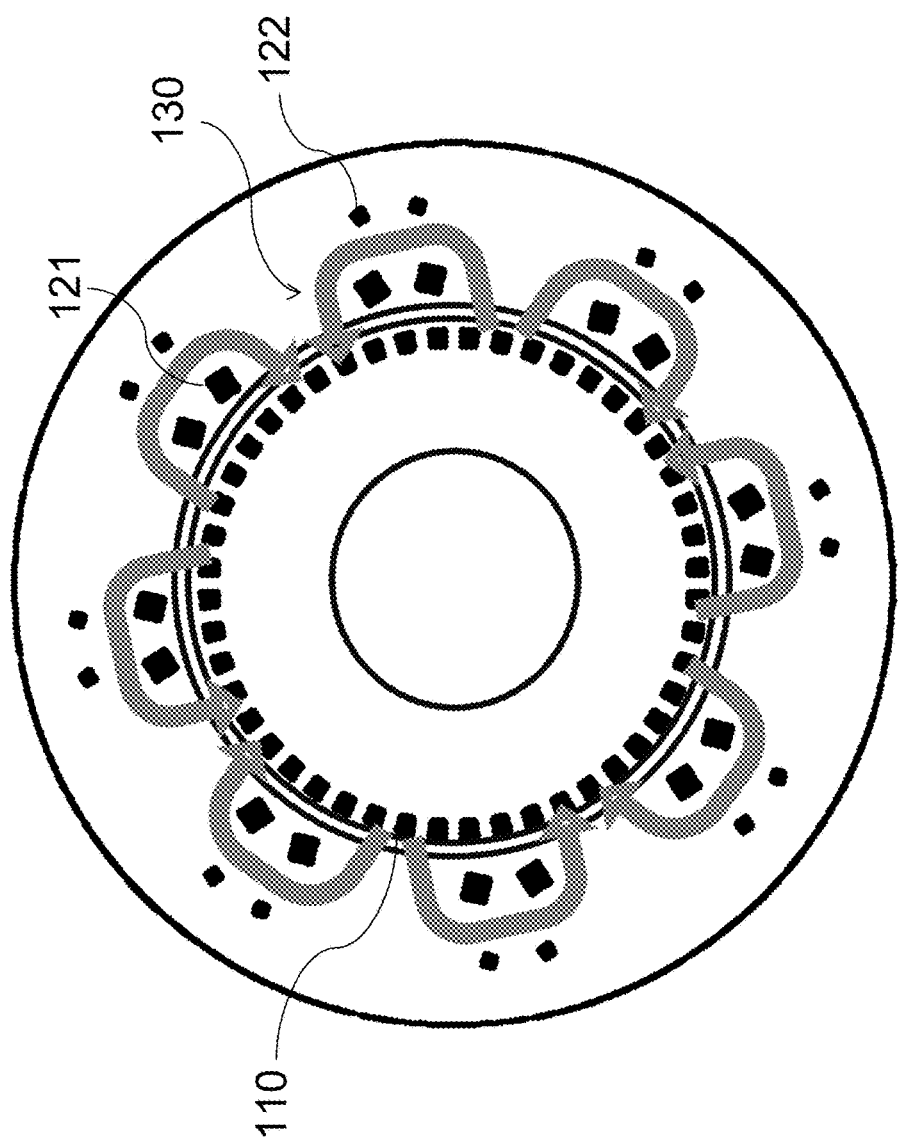

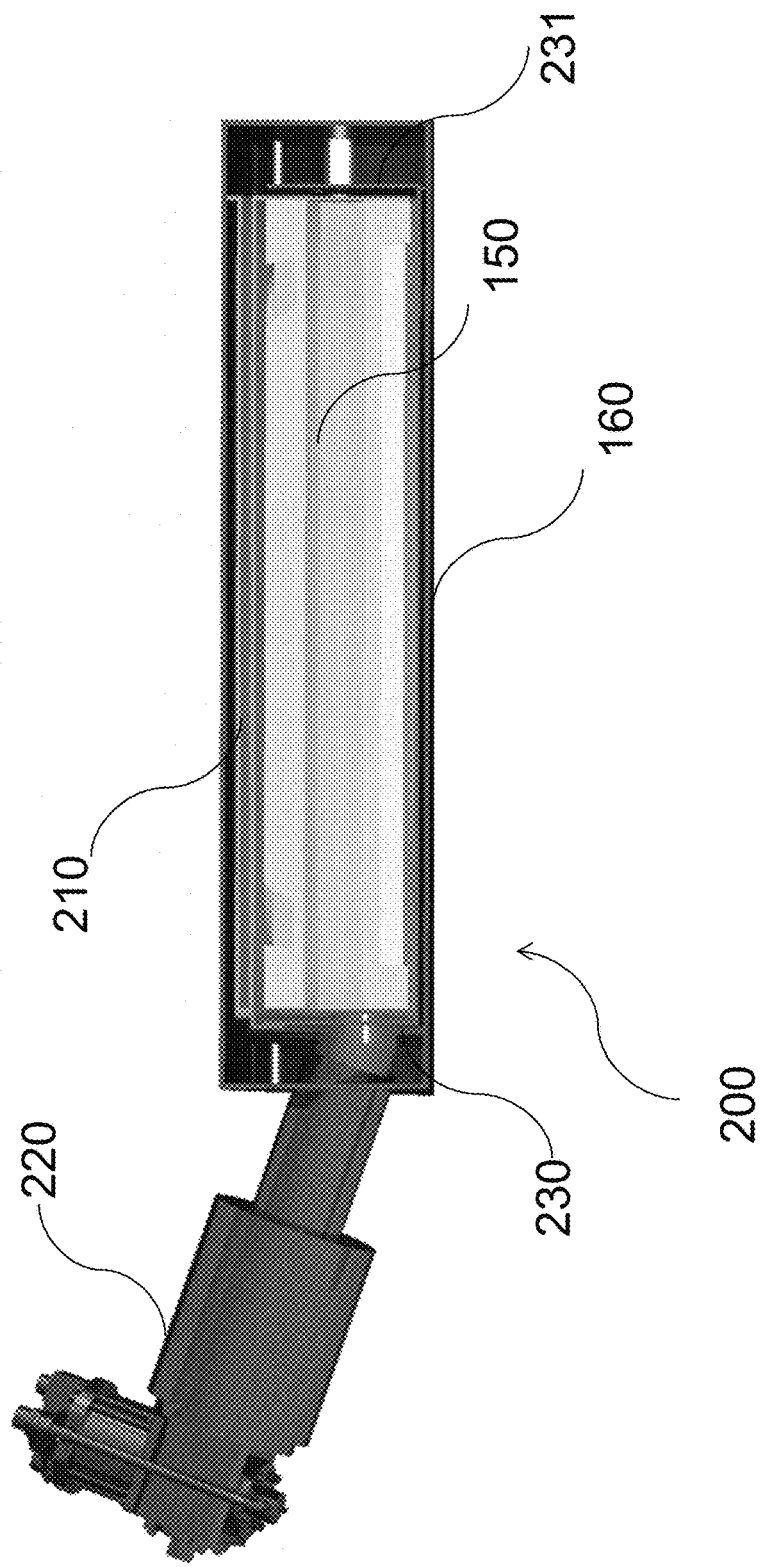

ACTIVELY SHIELDED SUPERCONDUCTING MACHINES

CROSS-REFERENCE TO RELATED APPLICATIONS

The present application claims the benefit of U.S. Provisional Patent Application No. 62/250,847, filed Nov. 4, 2015, the content of which is hereby incorporated by reference in its entirety.

BACKGROUND OF THE INVENTION

Electrical machines include, but are not limited to, rotary generators and motors, and linear generators and motors. These machines generally comprise a stator and rotor that are electromagnetically coupled. The rotor and stator may include a set of coils and an iron core to carry magnetic flux. Conventional copper windings are commonly used in the rotors and stators. However, the electrical resistance of copper windings, though low by conventional measures, is sufficient to contribute to substantial heating. This can lead to diminished efficiency, and specific power and power density (because of thermal constraints).

Recently, superconducting (SC) coil windings have been developed. SC windings have effectively no resistance and are highly advantageous, especially for the substantially "DC" field windings. The primary reason for this is the difficulty in managing AC losses in SC coils. Furthermore, even "merely" replacing the DC field coils can already lead to a significant jump in performance by relieving many traditional tradeoffs. Several types of electrical machines employing superconducting coils have been developed.

SC coils are capable of much higher current density than conventional coils, enabling machine designs with much higher magnetic reluctance and higher magnetic fields than traditional machines. Superconducting machines may employ "air-core" designs, with no iron in the rotor, or use a highly saturated core, to achieve air-gap magnetic fields higher than 2 Tesla. These high air-gap magnetic fields yield increased power densities of the electrical machine, and result in significant reduction in size and weight of the machine.

With the iron and its saturation limit removed, designs with much higher air-gap flux densities can now be considered. Fields that are 5-10× the typical values in electrical machines are routinely used in other superconducting applications like NMR and MM magnets, and even higher fields are theoretically possible with superconductors However, the practical challenge of containing the magnetic field emanating from the machine needs to be overcome. This can be a problem when such superconducting machines are integrated within systems that are sensitive to magnetic fields, for example in airplanes that have sensitive electronics. Personal safety is also a consideration. For example, medical implants like pace-makers are designed to operate below a magnetic field of 0.0005 Tesla.

Three methods have been used in the past to minimize the field emanating from the machine:

(a) Space out the field coils very far from other equipment. This may not be very practical because a large distance is needed to let the field decay to a low enough value (e.g. the 5 Gauss or 0.0005 T limit for medical implants). Increasing pole count (reduced pole-pitch) will help reduce outer field, but is also detrimental to the flux coupling within the machine. Studies show that pole counts of higher than 6-8 are not practical in air-core designs.

(b) Use an eddy current shield in an outer armature design. GE utilized such an approach in the 1980's to minimize weight. This however is also not very practical, because of the very large eddy current losses in the shield.

(c) Use a passive magnetic shield. This approach has been the most popular among SC machine designers. Though this option is more practical than the above two, it leads to relatively low power density, not just because of the weight of the iron, but because design optimization would lead to a relatively low operating field to minimize amount of iron required to shield the field. In fact, most practical designs have modest operating magnetic field levels (~2T).

BRIEF SUMMARY OF THE INVENTION

Embodiments of the present invention provide an actively shielded rotating electrical machine having superconducting coils. An actively shielded rotating electrical machine according to embodiments of the present invention provides an arrangement of electromagnetic coils which includes a set of main coils and a set of compensating, or shield, coils. The compensating coils may be configured relative to the main coils to substantially cancel out the electromagnetic field outside the machine.

The rotating electrical machine may include an armature winding assembly and a field winding assembly. The field winding assembly may include a set of main coils and a set of shield coils. The main coils and the shield coils may be designed to cancel out substantially most of the magnetic field outside the machine according to a number of considerations, such as topological mirroring, the number of turns of the shield coils, and variations in current in the main coil and the shield coil.

An armature winding assembly may rotate on the rotor while the field winding assembly remains stationary, or vice versa. An armature winding assembly or a field winding assembly may be a superconducting coil assembly, composed of coils formed from superconducting materials, such as low temperature superconductor (LTS) materials, high temperature superconductor (HTS) materials, or superconducting materials operative at other temperatures.

A coil former may enclose the armature winding assembly and the field winding assembly. A vacuum vessel may enclose the coil former.

An actively shielded rotating electrical machine may be provided with a conduction-cooled cryocooler system according to embodiments of the present invention. A cryocooler assembly may be thermally coupled to a superconducting coil assembly. A cryocooler assembly may be composed of a suspension system such as a torque tube 210, and a cryocooler. The cryocooler assembly may extract heat from the coils and other cold components of the machine.

BRIEF DESCRIPTION OF THE DRAWINGS

The features, objects and advantages other than those set forth above will become more readily apparent when consideration is given to the detailed description below. Such detailed description makes reference to the following drawings, wherein:

FIG. 2 illustrates a cross section of the rotating electrical machine of FIG. 1.

FIG. 8 illustrates a cooling system design for superconducting machine.

DETAILED DESCRIPTION OF THE INVENTION

The machines now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the machines described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Embodiments of the present invention provide an actively shielded rotating electrical machine. An actively shielded rotating electrical machine according to embodiments of the present invention provides an arrangement of electromagnetic coils which includes a set of main coils and a set of compensating, or shield, coils. An electric machine may have more than two poles and incorporate electromagnetic coils which run along the length of the machine and generate radial fields. Alternately, an electric machine may have coils which generate axial fields. The shield coils may be configured relative to the main coils to substantially cancel out the electromagnetic field outside the machine. The shield coils may be configured having similar geometry to the main coils.

Figure 1:
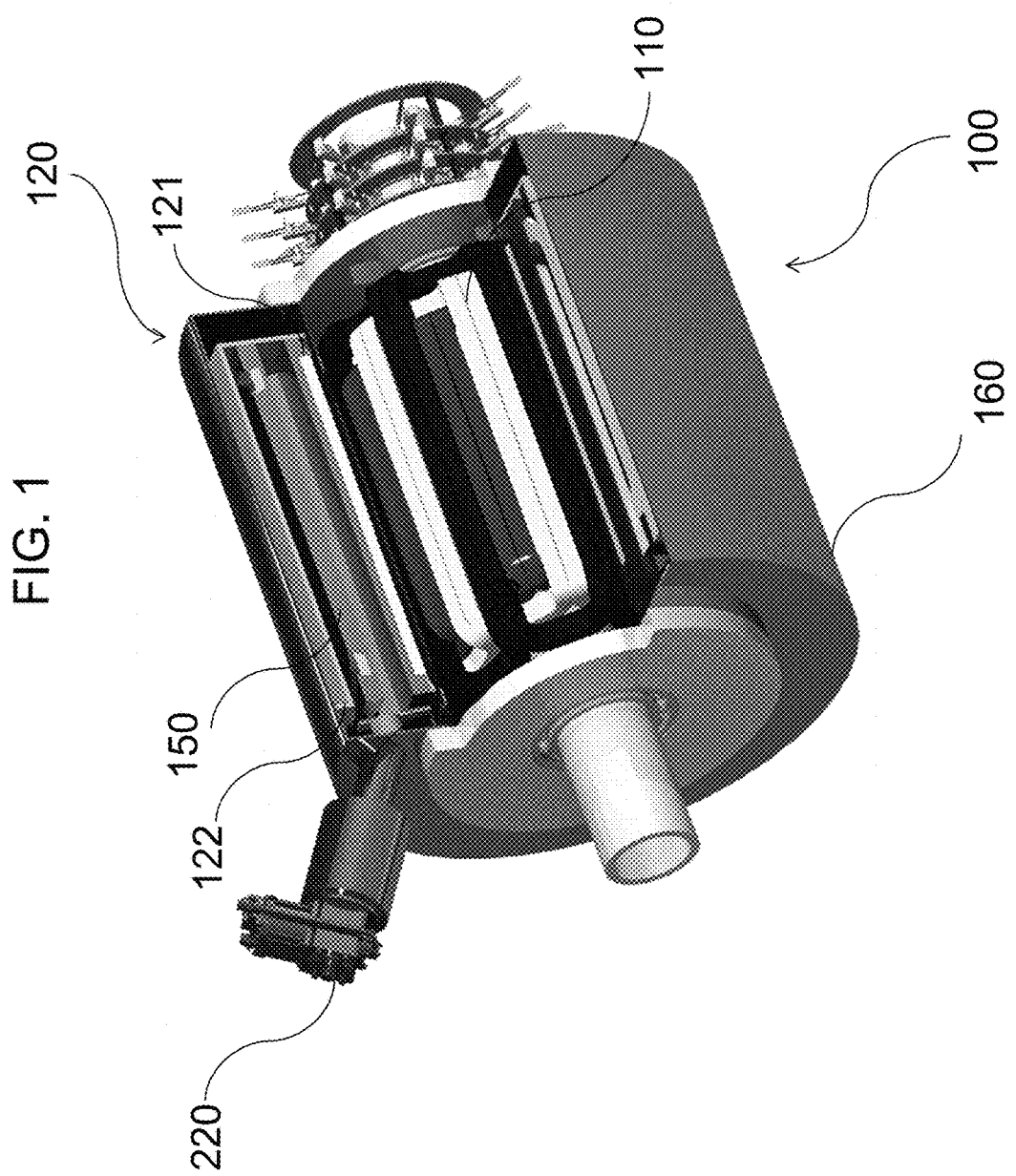
FIG. 1 illustrates an actively shielded rotating electrical machine according to an embodiment of the present invention.

FIG. 1 illustrates an actively shielded synchronous rotating electrical machine 100 according to an embodiment of the present invention. The rotating electrical machine 100 includes an AC armature winding assembly 110 and includes a DC field winding assembly 120 generating a DC magnetic field. Each winding assembly may include one or more electromagnetic coils oriented running along the length of the rotating electrical machine 100 such that the coil has an axis oriented radially to the rotating electrical machine 100. Each coil may be connected to a power supply supplying current to the coil.

The field winding assembly 120 may include a set of main coils 121 located close to the armature winding assembly 110, and a set of shield coils 122 placed radially apart from the armature winding assembly 110. The set of shield coils 122 is placed outboard of the set of main coils 121. The main coils 121 and the shield coils 122 may be designed to cancel out substantially most of the magnetic field outside the machine 100, based on a threshold of permissible magnetic field remaining outside the machine 100. Threshold of permissible magnetic field may be determined by personal safety considerations and tolerable electromagnetic interference levels. For example, 0.0005 Tesla is a common standard for threshold of permissible magnetic field.

Canceling out substantially most of the magnetic field outside the machine 100 may refer to canceling out substantially most of the magnetic field outside the vacuum vessel 160 of the machine 100, defined below. This may be accomplished by canceling out substantially most of the magnetic field outboard of the shield coil 122, such that the magnetic field further decays towards the exterior of the vacuum vessel 160. Embodiments of the present invention may accomplish this by topologically mirroring the main coil 121 and the shield coil 122; by constructing the main coil 121 and the shield coil 122 having a common spatial pole pattern; by constructing the shield coil 122 having approximately ⅓ the number of turns compared to the main coil 121; and by connecting the main coil 121 and the shield coil 122 to a power supply in series such that variations in current in the main coil 121 are reflected in current in the shield coil 122.

The topology of the main coil 121 and the shield coil 122 may be a racetrack shape, where a coil is straight along its length running along the length of the machine 100, and the straight "go" and "return" legs of the coil are connected at the ends in arc shapes.

The topology of the main coil 121 and the shield coil 122 may be a saddle shape, where a racetrack-shaped coil is curved about an elliptical topology.

An armature winding assembly 110 may be a rotating winding assembly assembled on the rotor of the machine 100, in which case the field winding assembly 120 may be a stationary winding assembly located outward to the armature winding assembly 110. Alternately, a field winding assembly 120 may be a rotating winding assembly assembled on the rotor of the machine 100, in which case the armature winding assembly 110 may be a stationary winding assembly located outward to the armature winding assembly 120.

An armature winding assembly 110 or a field winding assembly 120 may be composed of conventional copper coils. An armature winding assembly 110 or a field winding assembly 120 may be a superconducting coil assembly, composed of coils formed from superconducting materials, such as low temperature superconductor (LTS) materials, high temperature superconductor (HTS) materials, or superconducting materials operative at other temperatures. An armature winding assembly 110 or a field winding assembly 120 may be configured in accordance with rotating armature winding or field winding arrangements as known in the design of rotating electrical machines such that the superconducting coil assembly is stationary.

A coil former 150 may enclose the armature winding assembly 110 and the field winding assembly 120. A coil former 150 may be a cylindrical housing composed of aluminum or any other suitable metal or composite material. A coil former 150 may be designed to have high thermal conductivity and be in intimate contact with the coils of the winding assemblies to distribute the cooling to each coil. A coil former 150 may also serve as a structural member to keep the coils in place and transfer torque from rotating winding assemblies.

A vacuum vessel 160 may enclose the coil former 150.

FIG. 8 illustrates an actively shielded rotating electrical machine 100 provided with a conduction-cooled cryocooler system according to embodiments of the present invention. A cryocooler assembly 200 may be thermally coupled to a superconducting coil assembly. A cryocooler assembly 200 may be composed of a suspension system such as a torque tube 210, and a cryocooler 220. The cryocooler assembly 200 may extract heat from the coils and other cold components of the machine 100, so as to maintain the superconducting coil assembly at a cryogenic temperature. A cryogenic temperature according to embodiments of the present invention may be, for example, approximately 4.2 K.

A coil former 150 may be thermally coupled to the cryocooler through conduction paths between the cryocooler and the coil former, or through cryogen flow between the cryocooler and the coil former. A vacuum vessel 160 may isolate a stationary superconducting coil assembly from the outside environment to minimize heat transfer between the outside environment and the superconducting coil assembly, thereby minimizing cooling work required to maintain the superconducting coil assembly at a cryogenic temperature.

FIG. 8 illustrates that the field winding assembly 120 is a stationary superconducting coil assembly, and that the main coils 121 and shield coils 122 are embedded within an Aluminum 6061-T coil former 150 that is attached to the vacuum vessel 160 via a titanium alloy (Ti6Al4V) torque tube 210. The torque tube 210 may fold back on itself to increase the thermal transport length and minimize the heat load due to conduction. A torque tube 210, having a 5 mm tube thickness, has maximum displacement of 1.7 mm for an extreme loading condition (300 kNm). Aluminum heat shields 230 and 231 are inserted at the inner and outer radius of the assembly, to shield radiation traveling to the torque tube 210 and coil former 150. A 1.5 W dual stage cryocooler 220 provides cooling to the system. The first stage of the cryocooler 220 is thermally linked to both heat shields 230 and 231 and the torque tube 210, while the second stage is thermally linked to the coil former 150.

According to embodiments of the present invention where a superconducting coil assembly is composed of coils formed from high temperature superconductor materials, the superconducting coil assembly may be maintained at relatively higher cryogenic temperatures, and the cryocooler assembly 200 may be simplified. Among such simplifications, a cryocooler 220 of such embodiments of the present invention may be single stage rather than dual stage, and heat shields 230 and 231 may be omitted. Other simplifications may be made in accordance.

FIG. 2 illustrates radial flux in an air-core synchronous rotating electrical machine 100 according to an embodiment of the present invention where the armature winding assembly 110 is on the rotor and the field winding assembly 120 is stationary and outward to the armature winding assembly 110. Coils of the field winding assembly 120 are fed with substantially DC currents generating magnetic flux, which links the armature winding assembly 110. As the rotor rotates, this flux linkage becomes time-varying and induces a voltage on the armature winding assembly 110. The magnetic field from the shield coils 122 interacts with the magnetic field from the main coils 121 to substantially cancel out the magnetic field outside the machine 100. In this configuration, the return path for the magnetic field is through the air-gap 130 between the main coils 121 and the shield coils 122 where a ferromagnetic yoke would traditionally have been. The main magnetic flux path is substantially between the main coils 121 and the shield coils 122, with very little field existing outboard of the shield coils 122.

Figure 3B:
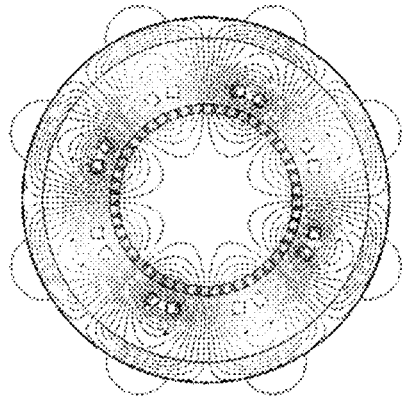
FIGS. 3A, 3B, and 3C illustrate magnetic flux lines in a rotating electrical machine cross section for different shielding options.
Figure 3A:
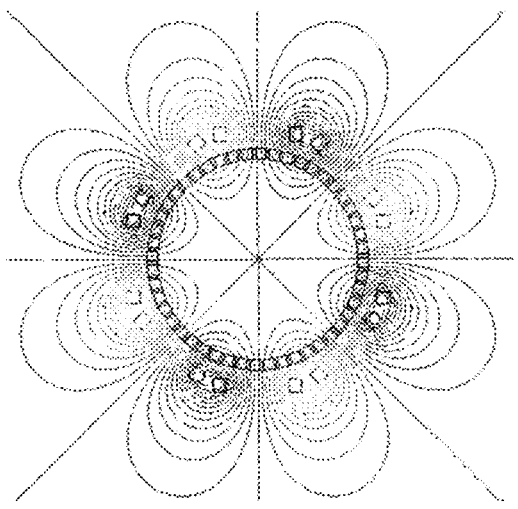
Figure 3C:
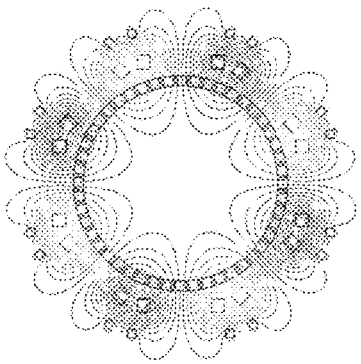

The flux lines shown in FIGS. 3A, 3B and 3C illustrate the shielding effect of shield coils 122 of the present invention (FIG. 3C) as compared to an unshielded machine (FIG. 3A) and known passive shielding (FIG. 3B). In a motor, time varying currents would be fed into the armature coils, which interacts with the time varying field to produce a substantially steady torque, converting electrical energy to mechanical energy. In a generator the energy flow is reversed but the same physics applies. FIG. 3A illustrates the unshielded magnetic field resulting from only exciting the main coils.

In known machines, a ferromagnetic yoke outside of the machine contains the return path of the magnetic flux. FIG. 3B illustrates the magnetic field resulting from using a ferromagnetic back yoke to contain the field.

FIG. 3C illustrates the shielded magnetic field resulting from exciting shield coils 122 of an actively shielded rotating electrical machine 100 according to embodiments of the present invention, without a ferromagnetic back yoke. Minimal magnetic field is observed outside the shield coils 122.

Figure 4:
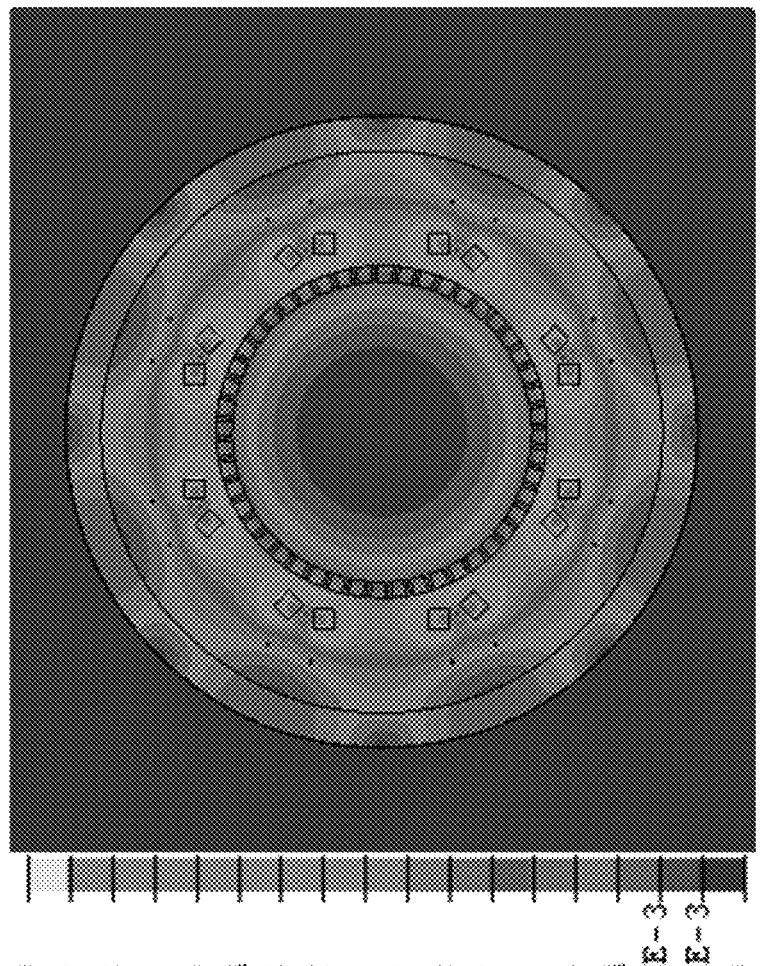
FIG. 4 illustrates flux density distribution in a rotating electrical machine cross section with a passive ferromagnetic shield.
Figure 5:
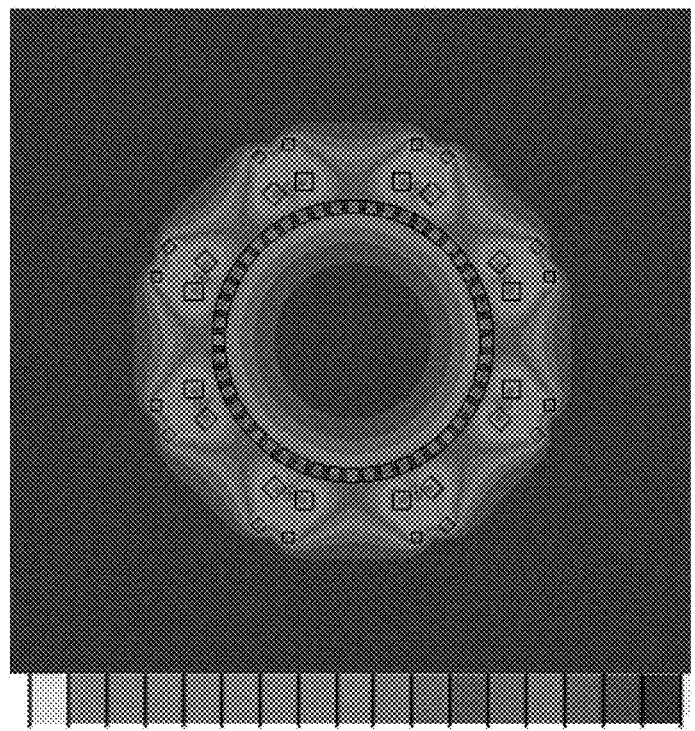
FIG. 5 illustrates flux density distribution in a cross section of the machine with an active EM shield.

FIGS. 4 and 5 illustrate effects on radial flux density of shield coils 122 of the present invention (FIG. 4) as compared to known passive shielding (FIG. 5).

FIG. 4 illustrates the flux density distribution in the active region of an example design of a rotating machine with a ferromagnetic yoke, according to a 2D finite element simulation. This adds significant weight, which is exacerbated as even higher magnetic fields are considered.

FIG. 5 illustrates the flux density distribution in the active region of an actively shielded rotating electrical machine 100 according to embodiments of the present invention, with power flowing to shield coils 122, according to a 2D finite element simulation. High magnetic fields are obtained in the active region in the air-gap 130, with virtually no field beyond the outer diameter.

Figure 6:
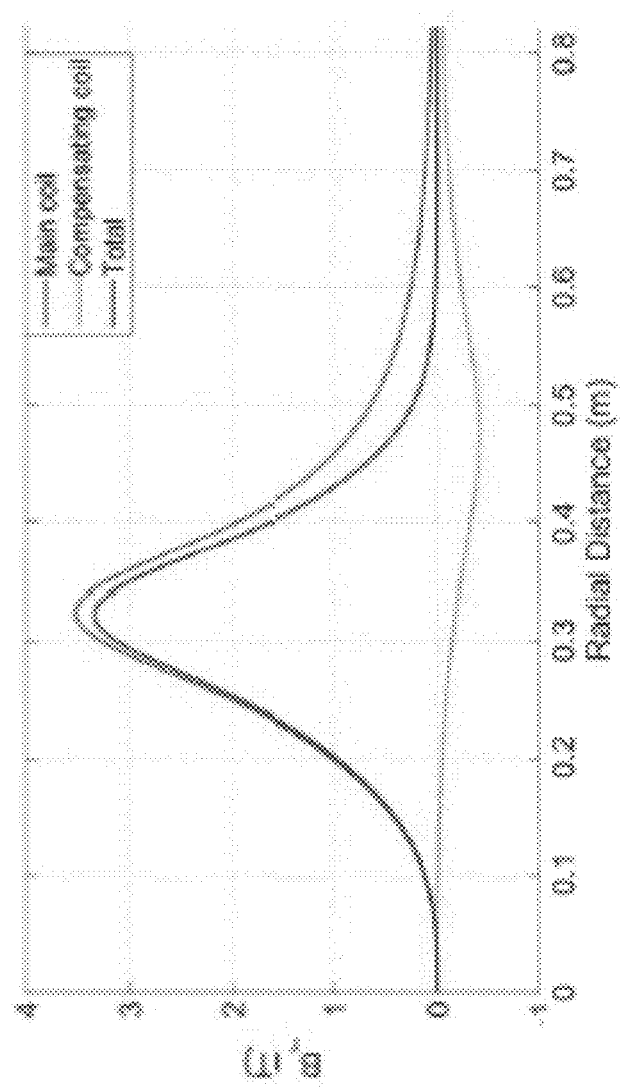
FIG. 6 illustrates radial variation of magnetic flux density along the direct axis of the machine, including the component due to the main coil, the component due to the shield coil, and the net field.
Figure 7:
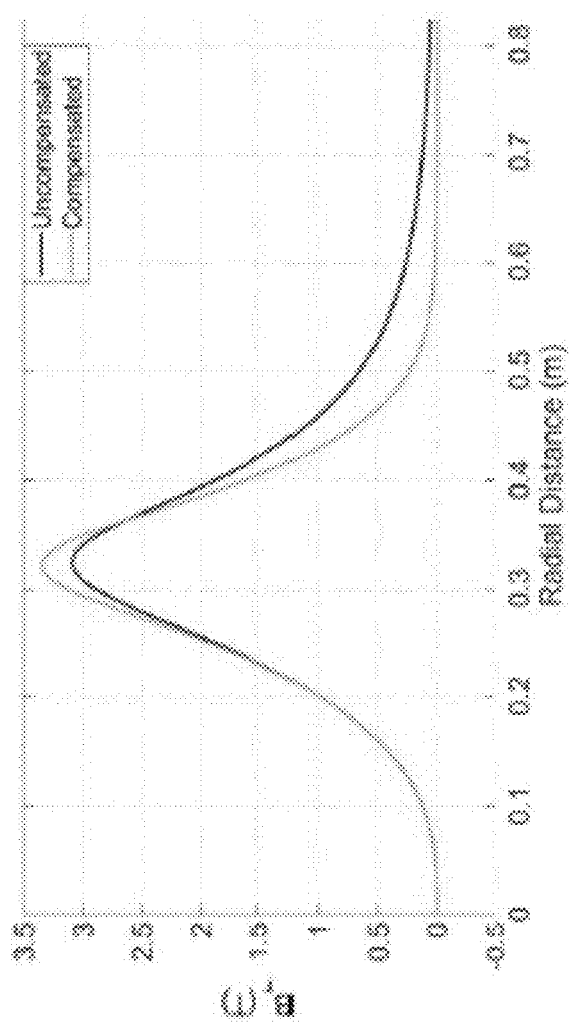
FIG. 7 illustrates a comparison of the radial variation of magnetic flux density along the direct axis of the shielded or compensated design vs. that from an unshielded or uncompensated design.

FIGS. 6 and 7 illustrate radial flux density as a function of distance from the radial axis under the effect of shield coils 122 of the present invention (FIG. 6) as compared to known passive shielding (FIG. 7).

FIG. 6 illustrates radial flux density as a function of radial distance for an 8-pole rotating electrical machine according to embodiments of the present invention. The illustrated embodiment of the present invention has a total coil usage of 87 $cm^2$ and a machine radius of 58 cm, where the machine radius of a machine according to embodiments of the present invention is defined as the radius at which the magnetic field is within the threshold of permissible magnetic field.

FIG. 7 illustrates radial flux density as a function of radial distance for an 8-pole rotating electrical machine optimized having only main field coils. This design employs less superconductor, 74 $cm^2$, but requires a machine enclosure radius of 90 cm.

An 8-pole rotating electrical machine may achieve a low machine volume, a high armature flux density, as well as effective shielding, or a smaller enclosure radius. Further embodiments of the present invention may utilize pole counts ranging from six to eighteen, with appropriate modifications to the parameter ranges. An increase in pole count may increase superconductor usage and reduce armature flux density, and may contain the fields more effectively with tighter flux coupling.

Embodiments of the present invention may provide very high power density in an rotating electrical machine by significantly increasing the air-gap magnetic flux density and eliminating the ferromagnetic steel traditionally employed to carry and shield magnetic flux. Actively shielded rotating electrical machines according to embodiments of the present invention may contain the magnetic fields of a high-field machines within the machine without iron or ferromagnetic shielding, while maintaining air-gap magnetic field levels that are 3-10 times greater than conventionally shielded rotating machines. For example, according to a 10 MW motor embodiment of the present invention as illustrated in FIGS. 6 and 7, the outer diameter may be reduced by 35%, with corresponding weight reduction, using only 17% more superconductor, compared to a conventionally shielded rotating machine.

While particular elements, embodiments, and applications of the present invention have been shown and described, the invention is not limited thereto because modifications may be made by those skilled in the art, particularly in light of the foregoing teaching. It is therefore contemplated by the application to cover such modifications and incorporate those features which come within the spirit and scope of the invention.

What is claimed is:

1. A rotating electrical machine, comprising:
    a rotor;
    a stator;
    an armature winding assembly comprising armature coils; and
    an field winding assembly comprising field coils, including a set of main coils and a set of shield coils;
    wherein the armature winding assembly and field winding assembly are separated by an air-gap;
    wherein one set of coils of the field coils is outboard of the other set of coils of the field coils relative to the rotating electrical machine.

2. The rotating electrical machine of claim 1, wherein a field coil is composed of a superconducting material.

3. The rotating electrical machine of claim 1, wherein an armature coil is composed of a superconducting material.

4. The rotating electrical machine of claim 1, wherein the main coils and the shield coils are each wound in a racetrack topology.

5. The rotating electrical machine of claim 1, wherein the armature winding assembly is on the rotor and the field winding assembly is stationary.

6. The rotating electrical machine of claim 1, wherein the armature winding assembly is stationary and the field winding assembly is on the rotor.

7. The rotating electrical machine of claim 1, wherein the rotor and the stator are electromagnetically coupled such that a magnetic field is generated between the rotor and the stator.

8. The rotating electrical machine of claim 7, wherein the air-gap encompasses a portion of the magnetic field.

9. The rotating electrical machine of claim 7, wherein the magnetic field is radial relative to the rotating electrical machine, and wherein axis of the armature coils and the axis of the field coils are radial.

10. The rotating electrical machine of claim 9, wherein one set of coils of the field coils is radially outboard of the other set of coils of the field coils relative to the rotating electrical machine.

11. The rotating electrical machine of claim 7, wherein the magnetic field is axial relative to the rotating electrical machine, and wherein axis of the armature coils and the axis of the field coils are axial.

12. The rotating electrical machine of claim 11, wherein one set of coils of the field coils is axially outboard of the other set of coils of the field coils relative to the rotating electrical machine.

13. The rotating electrical machine of claim 1, further comprising a cylindrical coil former, wherein the main coils and the shield coils are each enclosed by the coil former.

14. The rotating electrical machine of claim 13, further comprising a vacuum vessel, wherein the vacuum vessel encloses the coil former.

15. The rotating electrical machine of claim 13, further comprising a cryocooler;
    wherein the coil former is thermally coupled to the cryocooler.

16. The rotating electrical machine of claim 14, further comprising a torque tube;
    wherein the coil former is connected to the vacuum vessel by the torque tube.

* * * * *